July 7, 1964  J. N. SAUNDERS  3,140,048
HIGH TEMPERATURE HEATING SYSTEMS
Filed Oct. 10, 1961
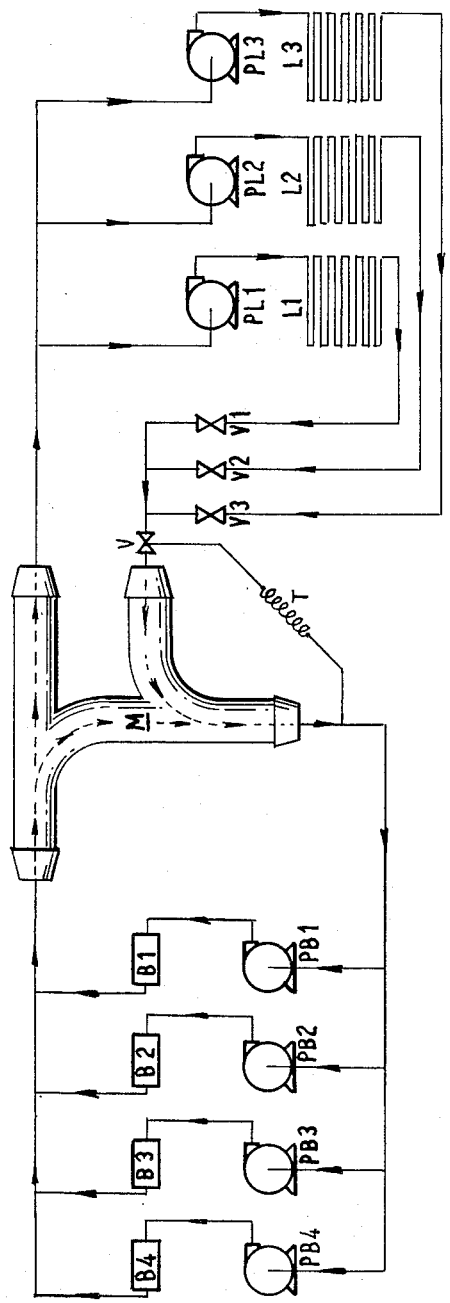
INVENTOR:
JACK NORMAN SAUNDERS
BY
Frederick Breitenfeld
ATTORNEY

3,140,048
HIGH TEMPERATURE HEATING SYSTEMS
Jack Norman Saunders, Wilmslow, England, assignor to Pressure Systems Limited, a corporation of Great Britain
Filed Oct. 10, 1961, Ser. No. 144,172
Claims priority, application Great Britain Oct. 11, 1960
1 Claim. (Cl. 237—56)

This invention concerns high temperature in heating systems, that is to say heating systems in which a hot liquid, usually water, is passed through a pressurized load circuit whereby the temperature of the liquid may be higher than that at normal (i.e. atmospheric) pressure.

In such systems conflicting considerations arise, and these will be illustrated with reference to the usual type of system in which water is heated by one or more boilers, usually of the shell or water-tube type, and circulated through pipe-work to and from the location of the load.

During the development of such systems using high temperatures it has become increasingly apparent that there are two desirable factors which are, prima facie, incompatible. On the one hand, considering the distribution system to and from the load, it is desirable to use large temperature differentials of the flow and return pipes. On the other hand considering the boiler plant it is desirable to restrict the temperature differential of the flow and return thereto.

Considering the boiler plant first, the designer would like, ideally, to have a constant rate of flow of water through his boiler and, in general, the closer the inlet temperature can approach the outlet temperature the better the boiler designer is pleased. In particular, the designer of the shell type boiler would require to restrict the temperature difference between inlet and outlet to the least possible amount to avoid thermal stress being set up within the boiler structure. Limitations on temperature difference are not, however, so strict in connection with the water tube boiler as far as thermal stress is concerned. However, in any boiler if the inlet temperature is below 250° F. to 260° F. the designer knows that he may expect trouble from the corrosive effect of condensation of fractions of the products of combustion on the boiler structure. From this it follows that, ideally, a comparatively large and preferably constant volume of water should be circulated through any boiler.

Turning now to the distribution system, where the water has to be conveyed over considerable distances, the designer would like to have a comparatively large temperature difference between his flow and return mains and, in general, the larger this difference can be made the less water need be conveyed through the system. It is in this way that the maximum economies can be achieved in capital cost as the smaller the amount of water to be circulated the smaller become the distributing mains and less power is needed in circulating pumps to maintain the water in circulation. It may, of course, be necessary in some cases, for example where high temperature water is required for process heating, to sacrifice to some extent the advantages gained by having a large temperature difference between flow and return in order to achieve the required high mean temperature for the particular processes.

The problems which arise are greater, the greater the complexity of the system. For example when space heating and process heating is required on the same installation separate distribution systems are normally used with separate circulating pumps. In fact both space heating and process distribution systems may be further subdivided as dictated by the lay-out of the particular site and for the catering for loads which may be applied at different times of the year. Furthermore, in any particular distribution system a variation in load can be catered for in two ways, either by maintaining a constant volume in the water in circulation, part of which may be shunted round the particular load according to the dictates of a thermostat, the ultimate result being that the temperature difference between flow and return reduces with reducing load and vice versa, or the load thermostat may actuate an on-off control which, by increasing resistance through the circuit, would alter the rate of water circulation by an amount which it is impractical to calculate because of the interdependence of so many of the relevant factors.

Thus, from what has been said hereinbefore, it will be appreciated that, as the scope of high temperature water systems increases, and their use extends the greater becomes the significance of the fundamental desires of the boiler engineers and the distribution engineer and greater becomes the divergence of their ideals.

The present invention has for its object to overcome this difficult situation, and is based on the realisation that it is possible to have flow and return arrangements for the boiler and flow and return arrangements for the distribution system which have different temperature differential favourable to their function. This is achieved, according to the present invention, by providing a primary heating circuit for the heating liquid and a secondary distribution circuit for such liquid, the said distribution circuit taking liquid from and returning liquid to the primary circuit, the characteristics and connections of the two circuits being arranged within a given load range to give a suitable rate of liquid flow, with relatively low maximum flow and return temperature differential through boiler means operatively associated with the primary circuit, and a relatively high flow and return temperature differential across the secondary circuit.

Preferably according to the invention the system includes a sensing means adapted to sense temperature differences between the return water flow in the secondary circuit and the return water flow in the primary circuit and to control the rate of water flow in the secondary circuit in step with such difference.

The invention is primarily concerned with heating systems in which a number of boilers are provided to be brought into operation as dictated by the load at any given period and the following more detailed description of the invention will relate to such a system.

In a multi-boiler system positive circulation round each boiler is controlled by a circulating pump delivering the water at a rate most suited to the particular boiler. Whenever a boiler is brought into line then its circulation pump is brought into operation either manually or automatically. All boilers in line deliver to a primary circulating system which delivers water to and takes water from a mixing point within the boiler house and which consists of a specially designed arrangement of pipe work. In this manner each boiler is assured of being supplied with water at the desired rate. Connections are provided on the mixer to permit water to flow into the distribution system and to return from this distribution system.

It is obvious that in any particular installation the requirements of the distribution system as to the rate at which water needs to be circulated under the very varying load which it has to cater for can also be varied.

As the heat load is proportional to the quantity of water circulated in a given time and to the temperature difference between the flow and return connections, the required variations in heat output can be obtained either by circulating a constant quantity of water per unit time and varying the difference between flow and return temperature or by maintaining a constant temperature difference between flow and return and varying the rate at which the water circulates. In multi-boiler systems according to the invention the rate at which water circulates through the various distribution systems is the controlling factor, the temperature difference between flow and return being maintained substantially constant. It is a pre-requisite of the proper functioning of such an arrangement that the circulating pumps in the distributing system should be of the centrifugal type and have non-overloading characteristics. This type of pump is in any case almost universally used.

To achieve control over the rate of water circulation, an automatic modulating control valve is inserted in the respective return connection to the mixer from the distribution system. The setting of the valve will be automatically determined by a thermostat also in the respective return connection from the distribution system. The thermostat will be set at a pre-selected temperature difference between flow and return under maximum load conditions. It is assumed that the flow temperature will be substantially constant as is almost universally the case and therefore any reduction in load tends to increase the temperature of the return from the distribution system. This promotes action in the thermostat which in turn would act on the mechanism of the automatic valve to commence closing of the valve. The effect of this is to increase the resistance in the circuit and thus reduce the rate at which water circulates. Closing of the valve continues until a steady state is achieved related to the particular load.

Should the load increase again then with the constant rate of water circulation the temperature difference tends to increase between the flow and return, again causing action of the thermostat which in turn causes the control valve to commence opening. In this manner the quantity of water in circulation is varied in accordance with the load requirements.

If sections of the distribution system are designed to operate under different temperature difference conditions then a flow control valve would have to be applied to each circuit but the overall effect would be the same.

As a safe-guard each flow control valve should be provided with a by-pass in which a manually adjusted valve is inserted. Thus the minimum quantity of water could always be permitted to circulate consent with anticipated minimum loads and conditions. This by-pass would also ensure that a circulation would be made available at least to minimum load requirements on failure of the control valve to the shut position. If isolating valves are placed in the main on each side of the control valve and inside the by-pass connections then the valve can be taken out for repair or replacement while the minimum circulation is being maintained. The size and setting of these by-passes would be determined by the minimum load conditions with one boiler in operation. This is to say that the water in circulation round the distribution system would retain its proper proportion to the amount of water being circulated round one boiler from a group and the distribution circulation will then revert to constant rate conditions with varying temperature differential between flow and return.

A further refinement along these lines may be made by arranging for an automatically controlled valve in the by-pass which would automatically come into operation once the main valve had reached a closing position related to minimum load in the manner just indicated. Alternatively the flow of water through the by-pass could be regulated by a suitably sized orifice of a valve on the side, the opening of this valve again being determined by the position of the main control valve.

Such an arrangement or a group of arrangements will then ensure that the flow of water through the distribution system is regulated in accordance with the load conditions within the accuracy of the controlling instruments and will ensure that from low load conditions the rate of flow through the distribution system will be progressively increased and will therefore be kept substantially in the correct proportion with the water circulating through the primary system which will be increasing progressively as successive boilers are brought into line. The reverse situation on reducing heat load would also be true.

It is to be appreciated that the form of circuit will be determined by the specific requirements in any given case but the single figure of the accompanying drawing illustrates diagrammatically one example of a multi-boiler heating system according to the present invention. $B_1$, $B_2$, $B_3$, $B_4$ are four boilers, and $PB_1$, $PB_2$, $PB_3$, $PB_4$ are circulating pumps associated therewith. M is a mixing device, drawn to a much larger scale than the rest of the figure, connecting primary and secondary circulatory systems. $L_1$, $L_2$, $L_3$, are heating loads, and $PL_1$, $PL_2$, $PL_3$, are circulating pumps associated therewith. $V_1$, $V_2$, $V_3$ are water flow control valves under the control of thermostats in the return connection of the secondary circulating system. A thermostat T is connected between the return connection of the secondary circulating system and the primary system and is sensitive to the temperature of the liquid leaving the mixing device. The thermostat serves to control the position of a valve V in the secondary system and at the outlet end thereof. The purpose of the valve scheme V is to protect the boilers against sudden temperature changes and also to allow of a rapid temperature increase in the primary system upon initial firing of the boilers. In practice the valve V opens at, for example, approximately 300° F. and thus, upon initial firing, no water will pass into the secondary system until the water in the primary system is at this temperature. When the temperature reaches 300° F. the valve V opens and allows water to flow from the secondary system. The mixing of the cold water from the secondary system with that hot water in the primary system will result in the temperature of the latter falling and the valve V closing. It will be apparent, therefore, that the cold water from the secondary system will be introduced gradually into the primary system and thus the water in the primary system will not undergo a sudden temperature fluctuation.

In consequence, damage to the boilers by sudden temperature variations in the water passing therethrough will be avoided.

It is to be appreciated that the temperature of 300° F. hereinbefore referred to is quoted merely by way of example, and the actual temperature at which the valve V functions will be determined by operating conditions and the thermostat T set accordingly.

In normal operation, when the water in the secondary system is heated to an appropriate temperature, the valve V serves as a thermostatically controlled check-valve. Any reduction in temperature of the water in the secondary system due, for example, to a sudden increase in load, will manifest itself as a reduction in the temperature of the water leaving the mixer M. The thermostat T will then partially close the valve V until the temperature of the water leaving the mixer reaches the figure for which the thermostat is set.

It is to be appreciated that the mixing device may be of any convenient form, and the invention is not to be restricted to the tubular arrangement illustrated in the drawings. For example, a mixing chamber might be formed from a cylindrical or other container having baffles therein to promote the mixing of the water from the secondary system with that of the primary system, the cylinder being adapted to supply the water to the secondary system or not as required.

I claim:

A heating system including a primary heating circuit for the heating liquid, a secondary distribution circuit for such liquid, a mixer device between said primary and secondary circuits and through which said secondary circuit takes liquid from and returns liquid to the primary circuit, sensing means adapted to sense the temperature of the liquid leaving the mixing device and to control the rate of liquid flow in the secondary circuit in correspondence with the deviation of such temperature from a predetermined level, and modulating control valve means in the secondary circuit between the secondary circuit and the mixing device, the said modulating control valve means being adapted to maintain substantially constant a predetermined temperature differential across the secondary circuit independently of load requirements, said modulating control valve means including a thermostat for sensing the temperature of the liquid leaving the secondary circuit, said modulating control valve means being responsive to said thermostat for allowing more or less liquid to flow through the secondary circuit depending upon whether the temperature of the liquid leaving the secondary circuit is below or above, respectively, a predetermined value.

References Cited in the file of this patent

UNITED STATES PATENTS

| | | |
|---|---|---|
| 2,532,608 | Dalin | Dec. 5, 1950 |
| 2,751,156 | Morgan | June 19, 1956 |
| 2,781,174 | Smith | Feb. 12, 1957 |
| 2,889,116 | MacCracken et al. | June 2, 1959 |
| 3,001,479 | Swenson et al. | Sept. 26, 1961 |

FOREIGN PATENTS

| | | |
|---|---|---|
| 75,181 | Denmark | Dec. 8, 1952 |

OTHER REFERENCES

Heating (Heating, Airconditioning Ventilating, Insulation), December 1958, John D. Troup Ltd., 90 High Holborn, London WC1, England (pages 402–404).